Jan. 21, 1969  H. A. McMASTER ETAL  3,423,198
METHOD FOR TEMPERING GLASS UTILIZING AN ORGANIC
POLYMER GASEOUS SUSPENSION
Filed June 14, 1965

INVENTORS
Harold A. McMaster, &
BY Norman C. Nitschke

Barnard, McGlynn & Reising
ATTORNEYS

United States Patent Office 3,423,198
Patented Jan. 21, 1969

3,423,198
METHOD FOR TEMPERING GLASS UTILIZING AN ORGANIC POLYMER GASEOUS SUSPENSION
Harold A. McMaster, Woodville, and Norman C. Nitschke, Perrysburg, Ohio, assignors to Permaglass Inc., Woodville, Ohio, a corporation of Ohio
Filed June 14, 1965, Ser. No. 463,748
U.S. Cl. 65—111                                    6 Claims
Int. Cl. C03b 27/00

ABSTRACT OF THE DISCLOSURE

In accordance with this invention a glass article is tempered or otherwise heat treated by placing the article in a heat transfer medium consisting of particulate material suspended in a fluid, the particulate material moving in the fluid into and out of contact with the glass article.

---

The subject matter of the present invention is an improved method for heat treating glass. The invention has particular utility for tempering glass and hence will be described specifically with reference thereto, though, in its broader aspects, the invention will find utility in any glass treating operation wherein it is necessary to accomplish a uniform rapid change in glass temperature.

In recent years there has been a very substantial increase in the use of tempered glass. Because of its strength and other safety features tempered glass has, for example, become standard for the side and rear windows of automobiles. Also, it is in ever increasing demand for use as architectural glass. Hence, there is an increased need for more efficient methods for performing the tempering operation.

To temper glass it is necessary to cool or quench the same rapidly and uniformly over its entire surface from a high temperature, close to the deformation temperature of the glass. If, in the cooling operation, any one portion of the glass is cooled at a substantially different rate than other portions, undesirable stresses are set up which can immediately cause the glass to shatter. At the present state of the art the quench is accomplished in a so-called blasthead by projecting gas, conventionally cool air, against the surfaces of the glass. Actually gas is a poor medium for rapidly removing the heat; however such technique does fulfill the need for uniformity of cooling over the entire surface of the glass and, at the present state of the art, it is considered that this essential feature dictates the sacrifice in heat transfer efficiency.

It is the principal object of the present invention to provide a glass heat treating method wherein there is excellent uniformity in heat transfer over the entire surface of the glass and yet with greatly increased efficiency. More specifically, the invention has as its main object the provision of a method for tempering glass wherein the quenching from a high temperature to a low temperature is accomplished uniformly and at an increased controlled rate.

Briefly, these objects are accomplished in accordance with the invention by utilizing as the heat transfer medium, a suspension of finely divided or particulate material in fluid, either liquid or gas. Where a gas such as air is used as the fluid, which is preferred, the suspended particulate material functions principally to increase the rate of heat transfer from the surface of the glass to the medium. That is, by means of the suspended particulate material, the heat conductance and capacity can be changed as desired to provide optimum heat transfer. In the case of a liquid, where the liquid normally has low heat conductance and capacity and relatively low boiling point, for example hydrocarbon oil, the particulate material can be used to increase the heat conductance and capacity thereby increasing the heat transfer from the glass to the medium and at the same time inhibiting the formation of a vapor phase adjacent the glass which would otherwise occur to the detriment of heat transfer efficiency and uniformity. In the case of high heat conductive liquids, such as molten tin, the suspended particulate material can be used to decrease the heat transfer to within the range required for proper tempering without danger of glass shattering. Hence, by means of the invention optimum heat transfer characteristics can be accomplished for increased efficiency in heating or cooling glass. The invention is particularly useful for glass tempering, with gas used as the fluid.

In effect then, the quenching medium of the preferred embodiment of the invention comprises a fluidized bed, i.e. finely divided solid material maintained in suspension in a gaseous medium as by means of the rapid movement of the gaseous medium or by vibration. With such a quenching medium there is a considerable increase in the rate of cooling by reason of the increased heat transfer from the hot glass to the particles in contact therewith, and yet without any decrease in uniformity of cooling over the entire surface of the glass article. As a result, quicker and improved more closely controlled tempering can be accomplished.

The above and other objects features and advantages of the invention will appear more clearly from the following detailed description of preferred embodiments thereof made, in part, with reference to the drawings in which.

Figure 1:
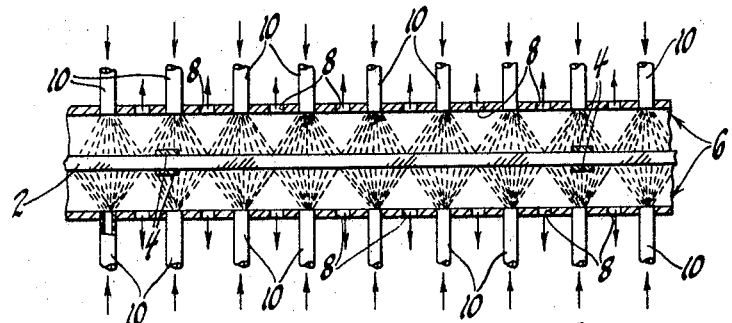
FIGURE 1 is a sectional top view of a sheet of glass being passed through a quenching blasthead for tempering in accordance with the invention.

Referring now to FIGURE 1, there is shown a sheet of glass 2, suitably supported by hanging from conventional tongs 4, being conveyed through a blasthead 6. The blasthead has vertical walls with outlet and inlet passages, 8 and 10 respectively, for the gas-solid particle quenching medium as hereinafter described in detail, a suitable blower (not shown) being provided to project the quenching medium through the inlets 10, against the glass sheet after which the gaseous quenching medium can exit through the outlet passages 8. The glass sheet is, of course, heated to the desired high temperature prior to entering the blasthead; for tempering, the glass sheet should be at or close to its deformation temperature, the precise temperature depending upon the particular composition or type of glass being treated, all as well known in the art.

In accordance with the invention, the quenching medium comprises a suspension of finely divided solid material in air. In practice, such medium can be formed by admitting the finely divided solid material into the air stream prior to or as it passes through the inlets 10, the air and solid material thereby being impinged into brief contact against the glass sheet. Some or all of the solid material will remain suspended in the air as it exits through the outlets 8, and that which does not remain suspended will fall to the bottom of the blasthead. The solid material can, of course, be recovered for recirculation through the system.

The finely divided solid material should have sufficient thermal stability to withstand decomposition or other substantial deterioration from the temperatures, generally up to about 1200° F. encountered by reason of brief contact with the hot glass sheet, and sufficient non-adhesiveness at the temperatures encountered to preclude it from adhering or sticking to the glass sheet. Also, particularly for the FIGURE 1 embodiment wherein the finely divided material is impinged against the glass with some force by the moving air stream it should have sufficient softness to preclude any marring of the glass sheet by reason of such impingement of the material thereon.

Figure 2:
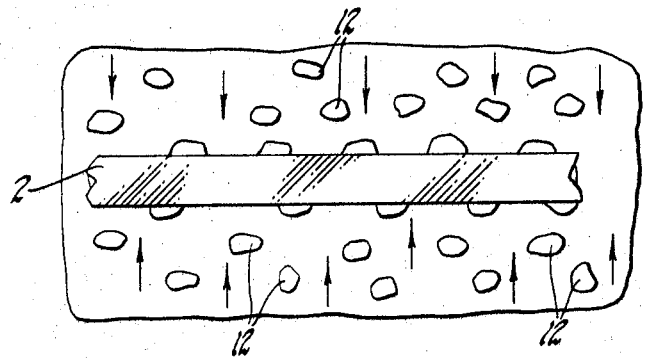
FIGURE 2 is a partial view in enlarged scale of the glass sheet and quenching medium shown in FIGURE 1.

Further, it is highly advantageous for the material to be of light weight or low density such that it can be easily suspended in the moving air. The quality of softness, which is desirable to prevent marring of the glass as indicated above, is additionally important in that with a soft material, the particles thereof tend to be squashed into excellent heat conducting surface-to-surface contact with the glass sheet when impinged thereon. This can be seen in FIGURE 2 wherein the solid particles 12 are, by the force of impact on the glass sheet, flattened into good surface-to-surface heat conducting relationship with the sheet. In addition to the qualities set forth above, the solid material should preferably be resilient such that the particles, after impact with the glass, reassume the shape they had prior to impact.

The most preferred material for the particles is silicone rubber, i.e. solid elastomeric polysiloxane. Of course a filler can and preferably should be included in the silicone rubber, ideally a filler which in addition to enhancing the strength of the material also enhances its heat capacity and heat conductivity. Graphite, metal powders, zinc oxide, clay and the like are typical examples of fillers which can be used. The metal powders and graphite are desirable fillers because of their high heat conductivity.

Silicone rubber is excellent as the material for the particles in that it has ample heat resistance, is relatively soft, does not stick to the glass sheet, is of relatively light weight and is resilient.

The polyfluorocarbons, particularly Teflon (polytetrafluoroethylene) are also excellent as the particulate material for the practice of the invention since they are heat resistant to about 1200° F., are relatively soft, are resistant to withstand deterioration from the brief contact with the glass which is at adherence and have the other desired characteristics. Kel-F (polytetrafluorochloroethylene) is another example of such materials. Filler materials such as those mentioned above can of course be used to advantage in the Teflon or other polyfluorocarbon. Further examples of finely divided materials which can be used for the practice of the invention, though generally not to equal advantage in the FIGURE 1 embodiment, are the metal powders such as aluminum, tin, zinc, etc. or powdered talc or graphite. Certain of the metal powders such as aluminum have the disadvantage of creating a fire or explosion hazard but this can be circumvented by utilizing an inert gas such as nitrogen as the gaseous phase of the quenching medium.

Ideally, the particles should be of spherical shape although this is not necessary. For example, silicone rubber or Teflon shredded to irregular particle shape is excellent. In practice, after a period of use the irregular particles tend to become spherical in shape. Of course the particle size should be sufficiently small to be easily suspended in the moving air mass. In general, particle sizes of about .01 inch and finer are fully satisfactory.

By means of the quenching medium including the solid particulate material, as described herein, excellent control can be obtained over the rate of cooling of the glass in the tempering operation and this, in effect, provides control of the precise characteristics attained in the tempered glass sheets. That is, the rate of quench can be controlled by the amount of solid particulate material included in the gas-solid particle quenching medium and also by selection of the solid particulate material to provide the thermal conducting characteristics desired. For example, where a particularly fast quench is desired, silicone rubber with a high proportion of a filler, such as powdered aluminum, having high thermal conductivity can be selected for the solid particulate material, and a high proportion of this solid particulate material can be included in the air or other gaseous medium. Further, the invention enables control over the time-temperature curve in the quenching operation. That is, if at the very outset of the quenching operation a high rate of cooling is desired immediately followed by a somewhat lower rate of cooling, the rate of admission o fthe solid particulate material into the air stream moving into the blasthead can be regulated such that for each sheet of glass being treated there is first a high proportion of the solid particulate material included, and then a lesser amount. Hence, in addition to providing an increased quench rate without any decrease in the uniformity of cooling over the entire surface of a glass article, the invention provides means for control in the quenching operation. As a result, improved tempered glass can be manufactured without significant increase in manufacturing costs. In the embodiment described above and shown in the drawings, the glass sheet being tempered is supported vertically, by tongs, as it passes through the blasthead; however it will be understood that the invention is not limited to this embodiment. For example, the glass sheets being tempered can, if desired, be passed through the blasthead in a horizontal position with the quenching medium, as described, being used to support the glass sheet out of contact with the blasthead. That is, the gas-solid particle quenching medium can be used as a circulating fluidized bed for supporting or floating the glass sheets as they are quenched.

Figure 3:
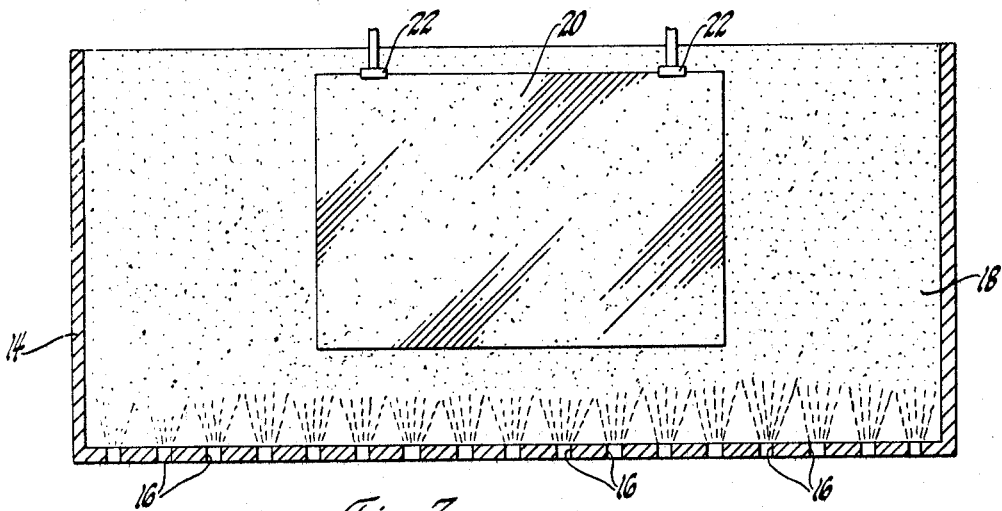
FIGURE 3 is a side view in section of another embodiment of the invention.

In FIGURE 3 there is illustrated still another embodiment of the invention comprising a container 14 open at the top and having gas jets or openings 16 at the bottom for emitting air or other gas under pressure to thereby maintain the solid particulate material 18 suspended in the form of a fluidized bed in the container. Other means, such as a vibratory bottom wall for the container or oscillation of entire container, can of course be used in place of the gas jets to maintain the particulate material suspended in the air or other gaseous phase. The glass sheet 20 which is to be tempered, and which is suitably supported by tongs 22, is simply immersed, in heated condition, into such fluidized bed in the container, the suspended particles of solid material thereby being caused to briefly contact the glass surface and rapidly and uniformly remove heat therefrom. In this embodiment harder particulate materials may be effectively used without significant danger of marring the glass since the particles though making contact with the glass are not impinged against it with force from right angles as in FIGURE 1. In fact, we have successfully tempered glass with such a fluidized bed using such materials as sand, glass heads and silicon carbide.

It should be understood that the invention can be utilized also for heating glass, as for example in the heating operation which precedes the quench for glass tempering.

Where liquid instead of gas is used as the fluid medium, the choice of particulate material will depend on whether it is desired to increase or decrease heat conductance and capacitance. In the case of liquids such as molten tin or other metal, powdered ceramic, such as silica, or similar low heat capacity material can be used as the particulate phase to lower the heat transfer rate to within usable limits for the particular heat treat operation. On the other hand, where low heat conductance liquid is used, the particulate material can be selected to increase the heat transfer.

For example, whereas a hydrocarbon oil by itself is a poor quenching medium for glass, a mixture of the oil and a solid particulate material, such as those heretofore mentioned, provides improved results by reason of the increase in heat capacity imparted by the dispersed solid phase which inhibits vaporization of the oil at the hot surface of the glass.

Glass at about 1200° F. has a specific heat of about .27 calorie per gram. The heat capacity of the heat transfer medium for the glass should ideally be higher than that of air but lower than that of molten tin or the like. With the present invention such can be accomplished. By controlling the particle size, amount, composition and motion of the particulate material in the gas or liquid, the heat transfer rate to or from the glass can be adjusted to provide optimum results.

It is within the purview of the invention to utilize a fluidized bed having an upper layer of one composition and a lower layer of another composition, and floating glass sheet between the two layers.

Hence, it will be understood that whereas the invention has been described in detail specifically with reference to certain embodiments thereof, various changes and modifications may be made all within the full and intended scope of the claims which follow:

The embodiments of the invention in which an exclusive property or privilege is claimed are defined as follows.

1. A method for heat treating a glass article including the step of cooling the glass article by impinging thereon a gaseous suspension of relatively soft, resilient, heat stable, non-adherent, solid particulate material comprising an organic polymer from a group consisting of silicone rubber and the polyfluorocarbons, said particulate material thereby being moved into and out of contact with said glass article.

2. A method as set forth in claim 1 wherein said organic polymer contains a filler.

3. A method as set forth in claim 2 wherein said filler has a higher heat conductivity than that of said organic polymer.

4. A method as set forth in claim 1 wherein said suspension is impinged against said article at generally right angles thereto.

5. A method as set forth in claim 1 and wherein said glass article is at least partially supported by said suspension during said heat treatment.

6. A method of heat treating a glass article including cooling the glass article by impinging thereagainst a gaseous suspension of particulate material having the properties of including an organic polymer from a group consisting of silicone rubber and the polyfluorocarbons, sufficient softness to prevent any marring of the glass article by reason of being impinged thereagainst, sufficient non-adhesiveness to prevent adhesion to the glass article, sufficient thermal stability to withstand decomposition and substantial deterioration when impinged into brief contact with the glass article at a temperature up to 1200° F., and being resilient; and continually moving the particulate material into and out of contact with the glass article.

References Cited

UNITED STATES PATENTS

| 2,874,480 | 2/1959 | Todd | 23—1 |
| 3,223,549 | 12/1965 | Fredley et al. | 65—60 |
| 3,250,643 | 5/1966 | Sergent | 117 |
| 3,260,584 | 7/1966 | Badger | 65—114 |

S. LEON BASHORE, *Primary Examiner.*

EDWARD R. FREEDMAN, *Assistant Examiner.*

U.S. Cl. X.R.

65—114, 182, 348